Sept. 16, 1958  E. VARKONY  2,852,238
AGITATOR FOR LINED PRESSURE VESSEL
Filed Aug. 19, 1957
FIG. 1.
FIG. 2.
FIG. 3.
FIG. 4.
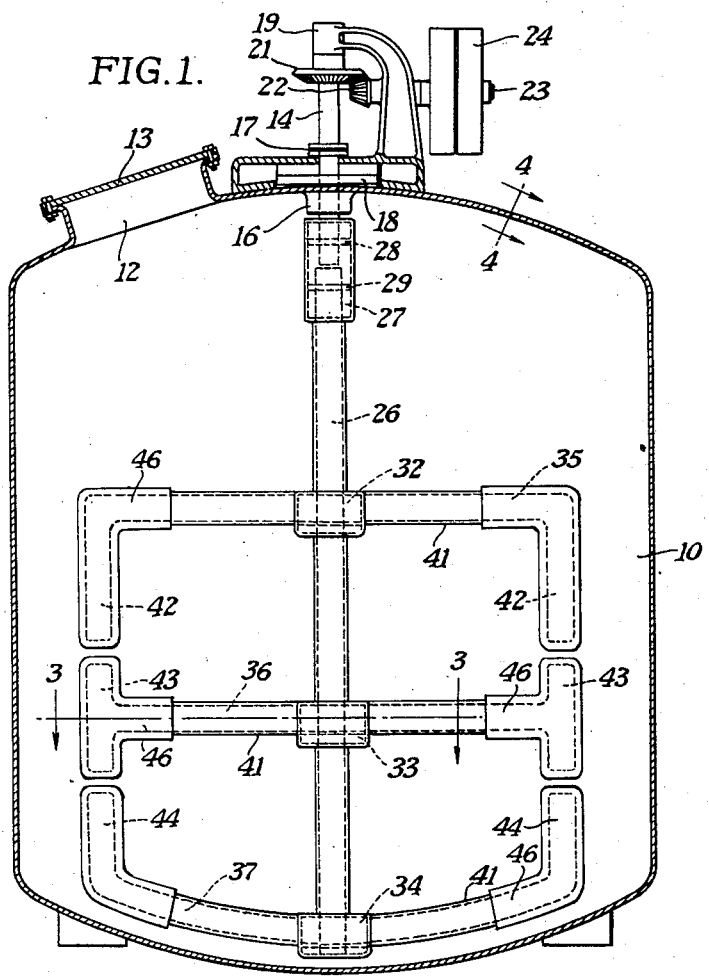
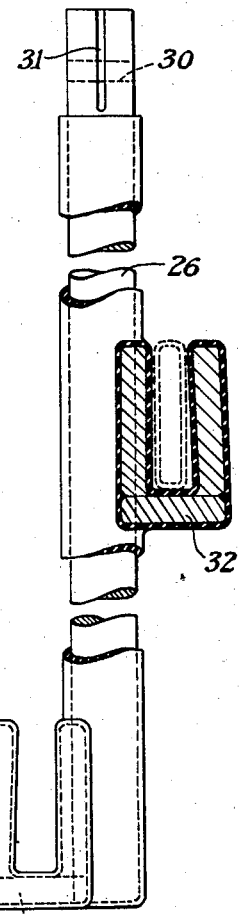
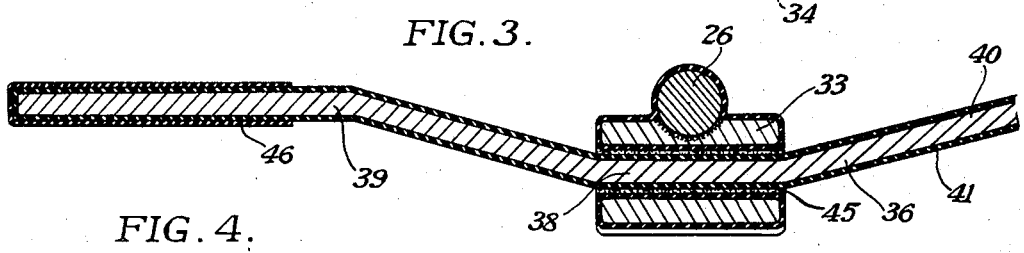
INVENTOR.
EMERICH VARKONY
BY Jugelter & Jugelter
ATTORNEYS United States Patent Office 2,852,238
Patented Sept. 16, 1958

2,852,238

AGITATOR FOR LINED PRESSURE VESSEL

Emerich Varkony, Cincinnati, Ohio, assignor to Toms River-Cincinnati Chemical Corporation, Cincinnati, Ohio, a corporation of Delaware Application August 19, 1957, Serial No. 678,843

5 Claims. (Cl. 259—107)

This invention relates to vessels in which corrosive chemicals, or the like, are processed.

In some chemical processing operations it is not possible to permit chemicals to come in contact with metal parts because of corrosive effects of the chemicals. Certain of these operations are conducted in vessels which are rubber lined. When the contents of a vessel requires stirring, a rubber covered agitator ordinarily is used for stirring or agitating the contents of the vessel. The rubber coating on arms of such an agitator is subject to abrasive forces and wears sufficiently rapidly that the rubber coating must periodically be replaced or repaired. In pressure vessels, the agitators are normally so large that they can not be removed through a conventional manhole and must be disassembled for servicing and replacing of the rubber coating. An object of this invention is to provide a coated agitator which can readily be disassembled for removal in sections through a manhole.

A further object of this invention is to provide a coated agitator which can be assembled and disassembled without use of bolts, nuts, or other threaded connection members which would require individual rubber coating following assembly.

A further object of this invention is to provide a sectional agitator in which each of the sectional parts has its own coating and in which blade arms of the agitator are supported in upwardly opening channel-shaped support brackets which are mounted on a central shaft.

The above and other objects and features of the invention will in part be apparent and will in part be obvious to those skilled in the art to which this invention pertains, from the following detailed description, and the drawing, in which:

Figure 1 is a view in transverse section of a pressure vessel equipped with an agitator constructed in accordance with an embodiment of this invention;

Fig. 2 is a view partly in side elevation and partly in section of the central shaft thereof, the shaft being removed from the vessel, the position of one of the agitator blades being indicated in dot-dash lines;

Fig. 3 is a view in section taken on the line 3—3 in Fig. 1; and

Fig. 4 is a view in section taken on the line 4—4 in Fig. 1.

In the following detailed description, and the drawing, like reference characters indicate like parts.

In Fig. 1 is illustrated a pressure vessel 10 provided with a manhole 12 which is closed by a cover 13. A drive shaft 14 extends through an axial guide 16 at the center of the upper end of the pressure vessel. The shaft 14 is guided by a vertical thrust bearing 17 and side thrust bearings 18 and 19 which are mounted on top of the pressure vessel. The shaft 14 is driven by appropriate gearing here illustrated as bevel gears 21 and 22, the bevel gear 21 being mounted on the shaft 14 and the bevel gear 22 being mounted on a transverse shaft 23. The transverse shaft 23 may carry a pulley 24 which may be driven by any appropriate belt drive or the like (not shown).

The lower end of the drive shaft 14 is connected to an agitator shaft 26 by a sleeve connector 27 which fits over the ends of the drive shaft and agitator shaft and is attached thereto by pins 28 and 29. As shown in Fig. 2, the agitator shaft 26 is provided with a transverse bore 30 for receiving the pin 29. A key slot 31 is provided in one side of the upper end of the agitator shaft 26 in which an appropriate key (not shown) may be received to keep the drive shaft, agitator shaft and sleeve together to turn as a unit.

The agitator shaft 26 extends downwardly along the axis of the pressure vessel, as shown in Fig. 2. The lower portion of the agitator shaft supports channel-shaped brackets 32, 33, and 34. The brackets 32, 33, and 34 are welded to the agitator shaft. The agitator shaft and the brackets are formed of appropriate strong, rigid metal, such as steel. The entire length of the agitator shaft and the brackets are coated with a coating of rubber or other appropriate material which is continuous and covers all of the agitator shaft and the brackets with the exception of the upper end portion of the agitator shaft where the key slot 31 and the bore 30 are located. The agitator shaft supports transverse agitator blades 35, 36, and 37 which are mounted in the brackets. As shown in Fig. 3, each of the agitator blades includes a central support section 38 and arms 39 and 40 which extend in opposite directions therefrom. Each agitator blade is demountable and has a continuous coating 41 of rubber or other appropriate corrosion resisting material which completely encases the agitator blade. The agitator blades may have end members of varying shapes, as indicated in Fig. 1. As shown, the blade 35 has downwardly extending end portions 42, the blade 36 has cross-shaped end portions 43, and the blade 37 has upwardly extending end portions 44. However, the end portions of the agitator blades are so made that each of the agitator blades, when demounted, can be passed through the manhole 12.

Upon assembly, the central support portion of each of the agitator blades is mounted in its appropriate bracket and a coating of a rubber base cement or the like 45, is deposited on opposite sides of the central support portion to fill the space between the arms of the bracket and the central support portion, and to hold the agitator blade in place. Each of the agitator blades is mounted to extend on opposite sides of the bracket in which it is received so that each blade is balanced and there is a minimum tendency of the blades to cock or swing with relation to the channel-shaped brackets.

As shown in Fig. 4, the inner wall of the pressure vessel is provided with a coating of rubber or other appropriate corrosion resistant material to protect the parts of the vessel which come in contact with the contents thereof.

As shown in Fig. 3, the ends of the agitator blades may be provided with an extra layer 46 of rubber or the like, as these are the sections of the blades which receive the greatest degree of wear.

When the blades have been used sufficiently that the coating on the blades begins to wear, the cement between the blades and the brackets is removed, as with a cutting tool and the agitator blades may be readily and quickly released, and passed through the manhole to the outside of the pressure vessel where the coating may be repaired or replaced. Then the blades are passed back through the manhole into the pressure vessel, set in position, and cemented in place for future use.

The agitator illustrated in the drawing and described above is subject to structural modification without departing from the spirit and scope of the appended claims.

Having described my invention, what I claim as new, and desire to secure by Letters Patent is:

1. An agitator for a hollow vessel which comprises an upright shaft, an upwardly opening channel-shaped bracket mounted on said shaft, a continuous corrosion resistant coating covering the shaft and bracket, an elongated agitator blade having a central support section and outwardly extending arms on opposite sides of the central support section, a continuous corrosion resistant coating on the agitator blade, the coating on the blade being separate from the coating on the shaft and bracket, the central support section of the blade being received in the bracket with the arms extending in opposite directions therefrom, and means for cementing the coating on the central support section of the blade to the coating on the interior of the bracket to attach the blade to the bracket.

2. In combination, a pressure vessel having a corrosion resistant interior coating, there being a manhole in the upper portion of the vessel, an upright shaft rotatably mounted inside the vessel, an upwardly opening channel-shaped bracket mounted on said shaft, a continuous corrosion resistant coating covering the shaft and bracket, an elongated agitator blade having a central support section and outwardly extending arms on opposite sides of the central support section, and a continuous corrosion resistant coating on the agitator blade, the central support section of the blade being received in the bracket with the arms extending in opposite directions therefrom, the blade, when released from the bracket, being adapted to pass through the manhole.

3. An agitator for a hollow vessel which comprises an upright shaft, an upwardly opening channel-shaped bracket welded to said shaft, a continuous corrosion resistant coating covering the shaft and bracket, an elongated agitator blade having a central support section and outwardly extending arms on opposite sides of the central support section, a continuous corrosion resistant coating on the agitator blade, the coating on the blade being separate from the coating on the bracket and shaft, the central support section of the blade being received in the bracket with the arms extending in opposite directions therefrom, and means for cementing the coating on the central support section of the blade to the coating on the interior of the bracket to attach the blade to the bracket.

4. In combination, a hollow pressure vessel having a corrosion resistant interior, there being a manhole in the upper portion of the vessel, an upright shaft rotatably mounted inside the vessel spaced from the manhole, an upwardly opening channel-shaped bracket mounted on said shaft, a corrosion resistant coating on the shaft and bracket, an elongated agitator blade having a central support section and outwardly extending arms on opposite sides of the central support section, a corrosion resistant coating on the agitator blade, the agitator blade being adapted to pass through the manhole, and means for holding the central support portion of the blade in the bracket with the arms extending on opposite sides of the shaft, whereby the agitator blade rotates with the shaft.

5. In combination, an enclosed vessel having a corrosion-resistant interior coating, there being a manhole in the upper portion of the vessel, an upright shaft rotatably mounted inside the vessel, an upwardly opening channel-shaped bracket mounted on said shaft, a continuous corrosion-resistant coating on the shaft and bracket, an elongated agitator blade having a central support section and outwardly extending arms on opposite sides of the central support section, and a continuous corrosion-resistant coating on the agitator blade, the central support section of the blade being received in the bracket with arms of the blade extending in opposite directions therefrom, the blade, when released from the bracket, being adapted to pass through the manhole.

References Cited in the file of this patent

UNITED STATES PATENTS

| | | |
|---|---|---|
| 479,937 | Fox | Aug. 2, 1892 |
| 1,156,851 | Pfouts | Oct. 12, 1915 |
| 1,379,707 | La Croix | May 31, 1921 |